United States Patent [19]

May

[11] 4,280,921
[45] Jul. 28, 1981

[54] IMMOBILIZATION OF WASTE MATERIAL
[75] Inventor: John R. May, Newport News, Va.
[73] Assignee: Newport News Industrial Corporation, Newport News, Va.
[21] Appl. No.: 965,726
[22] Filed: Dec. 1, 1978
[51] Int. Cl.³ .............................................. G21F 9/34
[52] U.S. Cl. ............................... 252/301.1 W; 75/206; 264/0.5
[58] Field of Search ................. 252/301.1 W; 264/0.5; 250/506, 507; 75/206

[56] References Cited

U.S. PATENT DOCUMENTS

| | | | |
|---|---|---|---|
| 3,878,275 | 4/1975 | Kasberg | 264/0.5 |
| 3,935,467 | 1/1976 | Gablin | 252/301.1 W |
| 4,115,311 | 9/1978 | Sump | 252/301.1 W |

FOREIGN PATENT DOCUMENTS 7222760  6/1972  Japan ............................... 252/301.1 W Primary Examiner—Deborah L. Kyle
Attorney, Agent, or Firm—Pollock, Vande Sande & Priddy

[57] ABSTRACT

A method for immobilizing or solidifying waste material which includes blending the waste material with powdered metal and subjecting the mixture of waste material and powdered metal to high pressure, and immobilized waste products obtained thereby.

22 Claims, 2 Drawing Figures

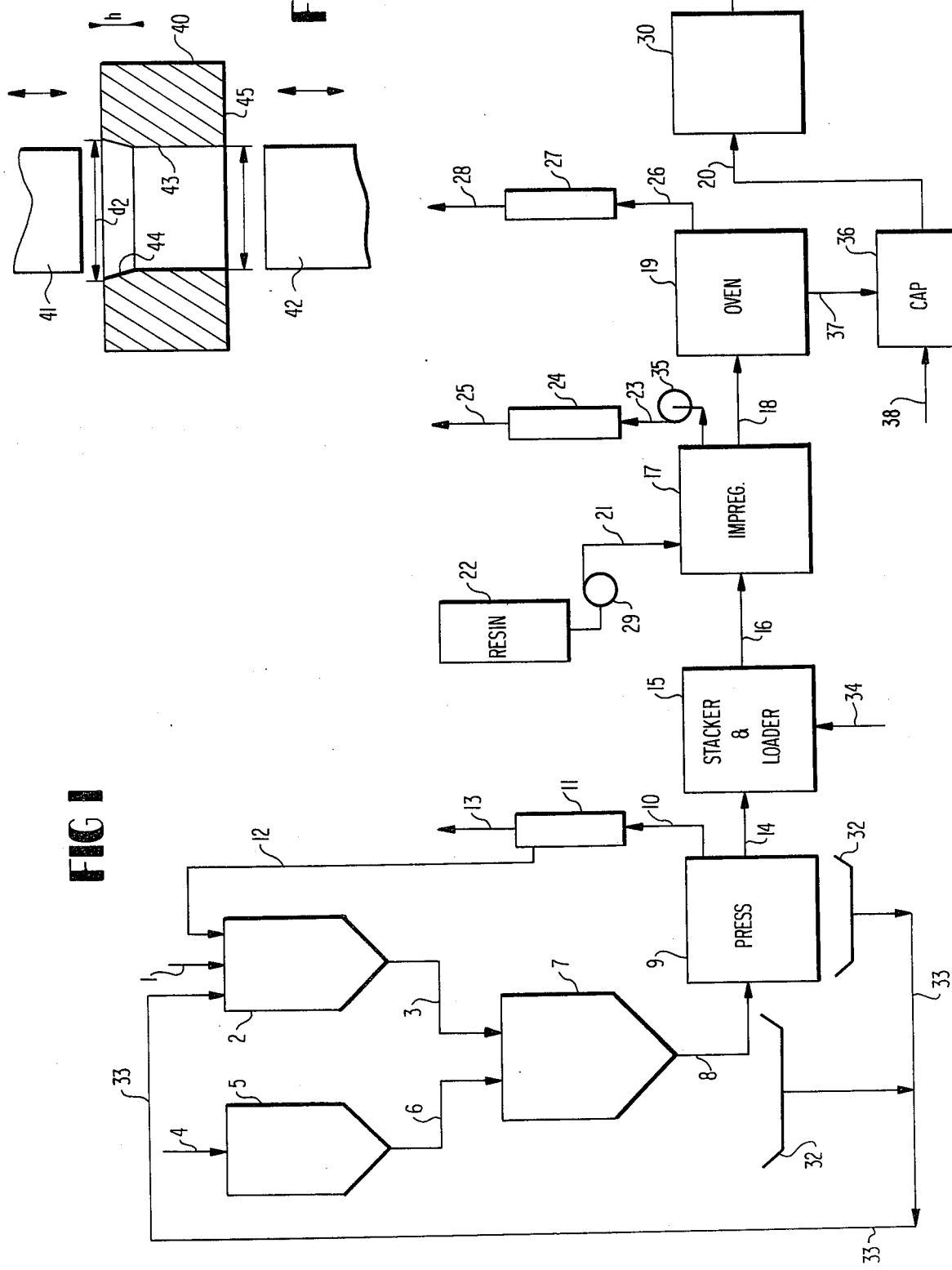

IMMOBILIZATION OF WASTE MATERIAL

FIELD OF THE INVENTION

The present invention is concerned with a method for the volume reduction, immobilization, and treatment of hazardous waste materials for disposal, storage prior to disposal, or storage prior to retrieval. The present invention is especially advantageous in the treatment of hazardous chemically toxic and hazardous radioactive wastes. The present invention is particularly directed to a process for immobilizing and solidifying with volume reduction of a wide variety of hazardous chemically toxic and/or hazardous radioactive anhydrous salts and/or ashes in powdered form which are produced by processes such as, but not limited to: drying, calcining, incinerating, chemical reaction, catalyzing, drug manufacture, and flue gas scrubbing processes.

BACKGROUND OF THE INVENTION

The potential hazards of waste disposal have, in recent years, captured the attention of industry, government, and the public. The growth of the chemical processing and power generating industries, in particular, has resulted in the production of a large number of by-product materials (e.g., waste products) which are potentially hazardous to man and his environment. Recognition of these hazards is exemplified by the passage of the Resource Conservation and Recovery Act (RCRA) of 1976, the increased attention applied to the disposal of radioactive wastes, and a variety of legislation and regulations aimed at protecting the environment from such hazards.

The necessity for these legislations and regulations was in large part due to inadequate protection of the environment with respect to waste disposal. Accordingly, it is believed that new methods of waste disposal will be required to meet these new, more stringent regulations.

The basic objective of the present invention is to provide a process which can reduce the volume of powdered waste and immobilize hazardous wastes in a solid form. It is a further object of the present invention to render the processed waste product resistant to thermal, mechanical and chemical attack mechanisms which might be expected during transporting, storage, or disposal in a hydrogeological environment.

Various methods have been suggested and developed for solidifying waste material such as low level radioactive waste materials including solidification with a bonding agent such as cement, borosilicate glasses, urea-formaldehyde resins, and bitumen. In addition, it has recently been suggested to treat nuclear waste by admixing the waste with a ceramic material and then sintering by hot isostatic pressing process (along these lines see Metal Powder Report, Volume 32, No. 3, March 1977, pages 98 and 99, and "Technologies for the Recovery of Transuranium Elements and Immobilization of Non-High-Level Wastes," G. L. Richardson, pages 307-313, Proceedings of the International Symposium on the Management of Wastes from the LWR Fuel Cycle, July 11-16, 1976, Denver, Colo., sponsored by ERDA).

This latter publication also suggests a process employing cold pressing and requiring a heat treatment after pressing to effect sintering. The sintering temperature is about 1000° C. On the other hand, the present invention does not require such sintering and still achieves strong solid products. This is believed to be due at least in part to the fact that this prior process suggested requires a ceramic rather than the types of metal employed herein. The "metal matrix" mentioned in FIG. 28 on page 309 of said article refers to the metal surface coating used in the "inertification" step suggested in said article.

Additional prior art which is of general interest concerning this subject matter includes U.S. Pat. Nos. 3,213,031 and 4,028,265 which suggest adding various materials to waste products and heating the mixture. In addition, U.S. Pat. No. 3,994,822 suggests coating waste particles with an alpha-silicon carbide, then heating to carbonize the binder. This patent also suggests hot pressing in order to melt silicon and carbonize the carbide in order to enclose the waste material.

Moreover, U.S. Pat. Nos. 3,993,579 and 4,010,108 are representative of those disclosures which suggest employing synthetic resins in treatment of waste material. U.S. Pat. No. 3,865,576 is of interest in that it suggests preparing a nuclear fuel by mixing $UO_2$-BeO and then hot pressing the mixture.

SUMMARY OF THE INVENTION

The present invention is concerned with a method for immobilizing, solidifying, and reducing the volume of powdered solid form waste material. The method includes blending waste material with powdered metal. The waste material is substantially anhydrous powdered solid material. The mixture of the waste material and powdered metal is compacted using a pressure of at least about 10 tons per square inch for sufficient time to provide a reduced volume, strong, solid product. The amount of the powdered metal employed is at least sufficient to solidify the waste material when the mixture is subjected to the above pressures.

The present invention is also concerned with the solid obtained by the above-described process—one objective being to attain a solidified product whose compressive strength is in excess of 800 pounds per square inch. The compacted solid product of the present invention includes: substantially anhydrous solid waste material, at least about 1.5% by weight of powdered metal, and optionally small amounts of lubricant which may be added for the purpose of reducing wear of pressing machine parts.

BRIEF DESCRIPTION OF DRAWINGS

FIG. 1 illustrates a sequence of processing steps which employs the method of the present invention in combination with a number of further processing steps.

FIG. 2 is a schematic cross-sectional view of a compacting unit suitable for the present invention.

DESCRIPTION OF PREFERRED EMBODIMENTS

The waste material to be treated according to the present invention can be waste material or by-product from any source provided it is a substantially anhydrous powdered solid material. The powdered waste material is usually substantially of non-metallic materials, but can include minor amounts (e.g., up to about 20%) of metals. The waste material to be treated in acordance with the present invention is usually in the form of particles having diameters of about 1 micron to about 1/16 inch. If the waste material to be treated is in solution or substantially wet, such can be dried for instance by heating to put it in proper form for use according to the present invention. Of course, the material can contain minor quantities of water such as would be present in the event the waste material to be treated is hygroscopic and would tend to pick up small quantities of water upon standing and exposure to normal atmospheric conditions. The waste material to be treated according to the present invention includes such waste materials as radioactive wastes including chemical salts, ashes of resins, and acid powders from the calcination or incineration of low level radioactive waste; waste materials from paint facilities such as pigments; high sulfur containing salts from paper pulp manufacturing; solids from chemical etchings; wastes from mineral acid manufacturers; chemical industry catalyst fines, spent acids, salts, spent caustics, and cyclone separator particles; agricultural and pesticide manufacture waste; drug manufacture waste including disposal of old drugs; solids from electroplating sludges including ferrous acids and chromic acids. Because of the relative dangers associated with radioactive materials, the present invention finds particular applicability in the treatment of low level radioactive waste materials.

A powdered metal is mixed with the waste material. The admixture is observed to produce a strong, solid form mass of reduced volume when the mixture is subjected to the pressing conditions of the present invention. The "bonding" metal employed can be any metal which is capable of being powdered and desirably is from a metal which in its ingot form is ductile and capable of being cold-worked or machine worked. In addition, the powdered metals should be low in oxide formations. The bonding material to be suitable in the process of the present invention must possess the above properties in order to provide the desired type of product. For instance, the use of ceramics (e.g., metal oxides such as aluminum oxide and silica) in the present process would not be suitable since such are much too brittle.

Examples of some particular metals suitable for the present invention include powdered iron, powdered nickel, powdered bronze alloys, powdered aluminum, and powdered steels such as powdered stainless steel. Powdered iron is preferred because of its relative availability and cost. The powdered metals employed according to the present invention generally have diameters of about 25 microns to about 1/32". Typical of the preferred compositions is Ancor MH-100, a product of Hoeganaes Corporation, which has particle size distribution as follows:

| U.S. Standard Mesh Sieve Analysis (Microns also Given) | Distribution, % |
| --- | --- |
| + 80 (177 microns) | 1 |
| −80 + 100 (149 microns) | 4 |
| −100 + 140 (105 microns) | 20 |
| −140 + 200 (74 microns) | 27 |
| −200 + 325 (44 microns) | 24 |
| −325 | 24 |

Generally the bonding metal is employed in amounts of at least about 1.5% by weight based upon the weight of the powdered waste material. The use of amounts of powdered metal in excess of about 20% by weight is generally not required or is not desirable since there is no economic advantage in doing so, unless higher strength or other properties are being sought. The preferred amounts of metal employed are from 1.5 to about 3% by weight and most preferred about 2 to about 3% by weight based upon the weight of the solid waste material.

The exact amount of powdered metal within the above range employed in any particular case will depend upon the specific desired physical properties of the product, and the properties of the waste material. For instance, as the physical properties of the waste material decrease, the amount of metal to employ would increase to achieve a particular desired compressive strength.

If the waste material already contains powdered metals of the type discussed hereinabove, it may be possible to decrease the amount of extraneously added metal as long as the mixture contains the requisite and desired total amount of metal stated above.

The product obtained by the process of the present invention is in the form of a solid mass having good compressive strength. For instance, products having ultimate compressive strengths of from about 800 to about 9500 pounds per square inch are readily obtainable by the process of the present invention. In addition, products having densities of about 1.8 to about 2.25 grams per cubic centimeter are readily obtainable from the process of the present invention.

The mechanical properties of the final product are not solely dependent upon the properties of the waste material but can be adjusted by the amount of powdered metal to be added thereto. Since no chemical process is relied upon for the initial immobilization of the waste material, end product properties obtained are not inherently totally dependent upon the variables of the waste material. Also, since no chemical reaction occurs between the waste material and the powdered metal, the leach resistance of the final product is not dependent upon the bonding agent used but is dependent upon either the container in which the material is placed and/or a particular property of any water resistant sealant which can be employed subsequent to the formation of the monolithic structure. Accordingly, the properties with respect to leach resistance can be tailored to particular specifications according to requirements of a specific user.

In addition, since the process of the present invention results in a reduction in the volume of material to be finally discarded, the cost and environmental impacts are significantly reduced.

Some advantages of the present invention include the fact that the process results in volume reduction of the total amount of waste material to be immobilized whereas the present methods employed require additional volume. In addition, since the processing equipment required according to the process of the present invention is readily obtainable, such can be easily installed at a plant site and accordingly waste from such hazardous plants such as nuclear power plants, hazardous chemical process plants, and wood pulp plants would not necessarily require transportation to a dump site.

The present invention can be more fully understood by reading the following description in conjunction with the figures which schematically illustrate a preferred process employing the present invention. With reference to FIG. 1, there is illustrated a container or hopper for waste material designated as 2 into which substantially anhydrous powdered waste material can be collected via a conduit 1. Although only one conduit is shown for the incorporation of fresh waste material, multiple conduits can be employed when desired. Powdered metal binder is added to storage container or hopper 5 via conduit 4. Predetermined amounts of waste material and powdered metal are conveyed from storage containers 2 and 5, via conduits 3 and 6, respectively into blending vessel 7. The waste material and powdered metal are uniformly admixed in blending tank or container 7 such as by use of a high speed stirrer. The blended admixture is then conveyed via conduit 8 to a press or other compaction device 9 for compacting the mixture generally at about normal room temperature to form the desired reduced volume, solid mass. At this stage, the reduced volume, solid mass is known as the "green" product. Green compact is a term also used when powdered metals are compacted prior to sintering which usually result in much higher green densities and superior mechanical properties. The structure can be any desired shape. One particularly easy to produce shape is a cylindrical shape.

The press or compactor 9 can include any type of equipment, a number of which are available suitable for applying a pressure of at least about 10 tons per square inch of pressure to the admixture. Generally, pressure above about 30 to 45 tons per square inch is not desirable since such large pressures tend to cause some laminar splits or parallel laminations in the finished product which for most purposes is not entirely desirable.

FIG. 2 is a schematic cross-sectional view of pressing tools suitable for carrying out this step of the operation. The tools inlude a die designated as 40 which has a cavity of the desired shape. The press also includes two opposed compression punches 41 and 42 which are designated to closely fit the hole 43 of the die 40. On operating the press, the lower punch is moved upward beyond the bottom surface 45 of hole 43 and then the die is filled with the mixture of waste material and powdered metal. During die filling, the lower punch 42 is lowered to enhance die fill (known as die underfilling). Next, the upper and lower punches 41 and 42, respectively, are simultaneously moved inward into the hole 43 of the die to apply the desired pressure. The punches in this embodiment will compact the mass to about one-half of its original height. Pressure and/or height of the green product may be controlled using suitable settings on the press or compactor 9.

The desired pressure is applied to the mixture for a time sufficient to cause bonding of the waste material by the metal and such that the yield point of the metal is exceeded. Generally, the high pressure is applied for at least 3 seconds. Below about 3 seconds, some problems in reproducibility of standard products from one sample to another occur. The maximum amounts of time in which the pressure can be applied is merely determined by economics and no real differences in properties have been observed by employing substantially higher amounts of time (e.g., up to about 30 seconds). Usually up to about 5 seconds is sufficient to assure complete and uniform bonding. After sufficient dwelling time under pressure has occurred, the upper punch member 41 is removed upward and then the lower punch 42 is pushed all the way upward into the hole 43 so as to expel the product from the die. It is noted that in this embodiment, the die exhibits a small taper 44 at the top of the hole. Such is to allow some relief of the stress of the material as it is expelled from the die as an assurance to prevent against lamination occurring in, or loss of material from, the green product. Of course, it is not necessary to employ this particular type of design since the assurance of reaching equilibrium state can be otherwise achieved; for instance, by slowly ejecting the product from the die. A typical product has a diameter of about 1 inch and when compacted is about ½ inch thick. In such an arrangement, the taper dimensions are shown on FIG. 2. Also, in such dimensions, about an inch thickness of mixture of waste material and powdered metal is compressed to about ½ inch.

It is important to note that due to internal friction during pressing of the powdered admixture both the top and bottom punches should compact the powders as described above, and typically the height should be limited to 2 inches die fill or approximately 1 inch green product to assure uniform pressure throughout the powder during compaction or pressing.

In addition, it may be desirable to include a lubricant on the inside surfaces of the die or admixed in with the waste-powder metal mixture to facilitate removal of the product from the die as well as reduce die mechanical wear. If a lubricant is employed in admixture with the powdered waste and powdered metal, such to be effective should be employed in amounts of about 3% to about 5% by weight based upon the weight of the waste material. The lubricant should be a powdered material such as powdered petroleum wax, powdered graphite, or powdered molybdenum disulphide. Such lubricants tend to ensure minimum lamination.

The compactor or press as well as other pieces of apparatus shown on FIG. 1 are enclosed in view of the types of materials handled so as to prevent contamination of the environment surrounding the apparatus and/or prevent an occupational health hazard. Connected to the press or compactor via conduit 10 is a filter 11 which is used to filter out any solid particles which might get entrained in the gases leaving the press or compactor 9. The gaseous effluent from the pelletizer after passing through the filter is then exhausted to the atmosphere via conduit 13 from filter 11. Any solids from the filter can then be removed therefrom via conduit 12 and if desired recycled back into the waste storage hopper 2. Containers 32 and recycle path 33 to hopper 2 are provided for any spillage from the transport conduits 1, 3, 4, 6, 8 and/or the compactor or press 9, or in the event it is necessary to empty these conduits or equipment.

The green product obtained from the press or compactor is then directed to a loading station 15 via conduit 14. In the loading station, a multiplicity of the individual green products are arranged together in a desired container for further processing if such is intended. Of course, it is understood that it is possible that the product obtained from the press or compactor 9 is in the desired form and need not be processed any further depending on the type of waste material employed and depending on the intended final disposal or destination of the material. The further treatment as discussed hereinabove is merely one of a multiplicity of treatments that could be used depending on the above factors.

One process design for packaging of the individual green products obtained from press or compactor 9 is by conveying the green products via 14 to a stacker/loader 15. In 15, the green product pellets are stacked and inserted into a container such as a (cylindrical) pipe with one end capped, entering by path 34. The loaded pipe is transferred via 16 to an encapsulation station 17 wherein vacuum pump 35 removes air from the interior of the pipe, exhausting to a filter 24 via conduit 23 to filter out any solids which may come off and the gases are exhausted to atmosphere via conduit 25. After vacuum has been held for a sufficient time, the stack of green products in the pipe is sealed or encapsulated by filling the void in the pipe with a suitable sealant.

The sealant composition is conveyed to the encapsulation station from storage tank 22 via conduit 21 by means of transfer pump 29. Suitable sealant compositions include epoxy and polyester potting type compositions, and other types, which are well known in the art. The sealant is employed to render the product waterproof, chemically inert, and the process is such to assure that the green product is totally sealed within the pipe container, so that should the container rupture, the contents will remain intact and leachproof. Normally, the sealant compositions will be heat curable which usually requires about 200° to about 350° F. for a time of less than about 8 hours. This curing is accomplished by conveying the coated materials to the curing oven 19 via means 18 which again can be an enclosed conveyor belt type. The piping design is sufficient to withstand the pressure of any gases created during the drying of the sealant composition. Likewise, gases created during the curing operation are filtered via filter 27 which is connected to the curing chamber 19 via conduit 26. After heat curing, the pipe is similarly conveyed via 37 to a capping station 36 where a cap entering by path 38 is placed and sealed on the uncapped end of the impregnated pipe. The packaged products are then conveyed to a packaging station 30 via conveyor means 20 whereby the materials can be assembled into a shipping container. The final packaged wastes are then suitable to be stored for instance underground or on site, leaving the process via path 31.

Of course, it is recognized that any of the subsequent treatment steps from the loader station 14 to the packaging station 30 can be arranged in various sequences and still obtain the desired end product. For instance, the encapsulation station 17 can be omitted and the stacked green product from station 15 can be inserted into the piping container followed by capping the pipe at station 36 and then sending the sealed pipe to a disposal site.

I claim:

1. A method for immobilizing and solidifying and reducing the volume of hazardous waste material which comprises blending substantially anhydrous powdered waste material with powdered metal, and subjecting the admixture to a pressure of at least 10 tons/in$^2$ for sufficient time to provide a strong solid of reduced volume and wherein the amount of said powdered metal is up to about 20% by weight based on the weight of solid waste material and is at least sufficient to immobilize and solidify said waste when subjected to said pressure.

2. The method of claim 1 wherein said waste material has a diameter of about 1 micron to about 1/16 inch.

3. The method of claim 1 wherein said waste material is low level radioactive waste material.

4. The method of claim 1 wherein said powdered metal is selected from the group consisting of powdered iron, powdered nickel, powdered bronze alloys, powdered aluminum, and powdered steels.

5. The method of claim 1 wherein said powdered metal is powdered iron.

6. The method of claim 1 wherein the amount of said metal is at least about 1.5% by weight based upon the weight of the solid waste material.

7. The method of claim 1 wherein the amount of powdered metal is about 1.5 to about 3% by weight based upon the weight of the solid waste material.

8. The method of claim 1 wherein the powdered metal is employed in amounts of about 2 to about 3% by weight based upon the weight of the solid waste material.

9. The method of claim 1 wherein the powdered metal has a particle size distribution as follows:

| Particle Size | Distribution, % |
|---|---|
| Larger than 177 microns | 1 |
| Between 177 and 149 microns | 4 |
| Between 149 and 105 microns | 20 |
| Between 105 and 74 microns | 27 |
| Between 74 and 44 microns | 24 |
| Smaller than 44 microns | 24 |

10. The method of claim 1 wherein the pressure is 10 to about 50 tons per square inch.

11. The method of claim 1 wherein the mixture of solid waste material and powdered metal is subjected to the pressure for at least about 3 seconds.

12. The method of claim 1 wherein the composition also includes about 3 to about 5% by weight of a solid lubricant.

13. The method of claim 12 wherein said lubricant is powdered: petroleum wax, graphite, or molybdenum disulphide.

14. A strong, reduced volume, self-supporting solid obtained by the method of claim 1.

15. The method for immobilizing, solidifying and reducing the volume of hazardous waste material which comprises stacking a plurality of the strong solids produced by the method of claim 1, inserting the resulting stack into a container, conveying the container with the stack to an encapsulation station, and filling the free space in the container with a sealant to thereby encapsulate the solids and render them waterproof, chemically inert and leachproof.

16. The method of claim 1 wherein the powdered metal has a diameter of about 25 microns to about 1/32 inch.

17. The method of claim 1 which is carried out in the absence of a sintering step.

18. The method of claim 1 wherein the powdered waste material is selected from the group consisting of low level radioactive materials, spent acids, spent salts, spent caustics, cyclone separator particles, solids from electroplating sludges, solid residues from chemical etching, catalyst fines, pigment residues from paint facilities, high sulfur residues from paper pulp manufacturing, and residues from mineral acid, agricultural, pesticide, and drug manufacturing.

19. The method of claim 18 wherein the waste material is mixed with a powdered metal selected from the group consisting of powdered iron, powdered nickel, powdered bronze alloys, powdered aluminum, and powdered steels.

20. A solid having a compressive strength of at least 800 pounds per square inch obtained by the method of claim 19.

21. A solid having a compressive strength of at least 800 pounds per square inch obtained by the method of claim 1.

22. A solid having a compressive strength of at least 800 pounds per square inch and containing 1.5 to 20 percent by weight of powdered metal, based on the weight of the solid waste material, obtained by the method of claim 1.

* * * * *